(12) United States Patent
Jakoby et al.

(10) Patent No.: US 9,525,499 B2
(45) Date of Patent: Dec. 20, 2016

(54) CELLULAR UP-LINK HARMONIC SPURS MITIGATION IN WI-FI AND BLUETOOTH RECEIVERS

(71) Applicants: Assi Jakoby, Herzelia (IL); Michael Kerner, Netanya (IL); Shay Shahaf, Beit-Hanania (IL); Bruno Jechoux, Antibes (FR)

(72) Inventors: Assi Jakoby, Herzelia (IL); Michael Kerner, Netanya (IL); Shay Shahaf, Beit-Hanania (IL); Bruno Jechoux, Antibes (FR)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/582,997

(22) Filed: Dec. 24, 2014

(65) Prior Publication Data
US 2016/0191178 A1    Jun. 30, 2016

(51) Int. Cl.
H04B 1/00       (2006.01)
H04B 15/00      (2006.01)
H04B 17/21      (2015.01)
H04B 7/06       (2006.01)
H04W 4/00       (2009.01)
H04W 72/04      (2009.01)
H04W 76/04      (2009.01)

(52) U.S. Cl.
CPC ............ *H04B 17/21* (2015.01); *H04B 7/0617* (2013.01); *H04B 7/0634* (2013.01); *H04B 15/00* (2013.01); *H04W 4/008* (2013.01); *H04W 72/0453* (2013.01); *H04W 76/048* (2013.01)

(58) Field of Classification Search
CPC .................................................... H04B 17/21
USPC ......................................................... 455/63.1
See application file for complete search history.

(56) References Cited

U.S. PATENT DOCUMENTS

| | | | |
|---|---|---|---|
| 2009/0239565 A1* | 9/2009 | Han | H04B 7/0404 455/512 |
| 2010/0137025 A1* | 6/2010 | Tal | H04B 15/02 455/553.1 |

\* cited by examiner

*Primary Examiner* — Ayodeji Ayotunde
(74) *Attorney, Agent, or Firm* — Forefront IP Lawgroup of Christie and Rivera, PLLC

(57) ABSTRACT

Described herein are technologies related to an implementation of improving de-sensitivity in a receiver of a portable device.

20 Claims, 4 Drawing Sheets

CELLULAR UP-LINK HARMONIC SPURS MITIGATION IN WI-FI AND BLUETOOTH RECEIVERS

BACKGROUND

Wireless communication systems may use one or more channels to transfer data between a transmitter and receivers. These communication systems may operate according to a set of standards defined by the Institute of Electrical and Electronics Engineers (IEEE) 802.11 committee for Wireless Local Area Network (WLAN) communication.

During the transfer of data between the transmitter and receivers, multipath problems and other conditions such as a presence of interfering signals may affect the reception of data packets. For example, the presence of the harmonic spurs that may mix with the receiving of the data packets may cause problems with signal detecting, amplifier gain adjustment, and signal decoding. To this end, the wireless communication systems employ various techniques to solve these problems and conditions.

For example, during co-running operations between multiple modems in a particular device, a frequency of operation, physical location, and other characteristics of a particular modem may affect the frequency of operation of another modem. In this example, knows solutions restrict the operation of the aggressor modem to mitigate its effect on the frequency of operations of the victim modem.

As such, there is a need to mitigate interferences between modems at the receiver of the portable device.

DETAILED DESCRIPTION

Described herein is a technology for improving de-sensitivity in a receiver circuitry or system of a portable device. For example, a frequency of operation such as during a downlink (DL) data communication operation by a first modem (e.g., cellular/LTE modem) is affected by radio frequency (RF) signals from a second modem (e.g., Wi-Fi, BT, etc.), or vice-versa. In this example, when the second modem is the aggressor modem, the RF signals from the second modem may either provide an out-of-band overdrive current or an interference to an at least one antenna of the first modem. As such, a calibration process may be performed to cancel these effects on the at least one antenna of the first modem.

In an implementation, the first modem is configured to receive a first set of radio frequency (RF) signals (e.g., set of calibrating RF signals) from a second modem during the DL data communication or during a discontinuous reception (DRx) mode. In this implementation, the first modem utilizes an algorithm to determine the effect or impact of the first set of RF signals to its frequency of operation such as, for example, the DL data communication that is currently performed in the first modem.

Based from the determined impact, the first modem may either determine an optimum beamforming vector, or the first modem may measure signal energies at each transmission sub-carrier that transmitted the first set of RF signals. In both cases, the second modem may utilize the determined optimum beamforming vector or the measured signal energies in forming a second set of RF signals that provides nulling effect (in case of blocking signal) or reduction of interferences (in case of de-sense) on the at least one antenna of the first modem.

Figure 1:
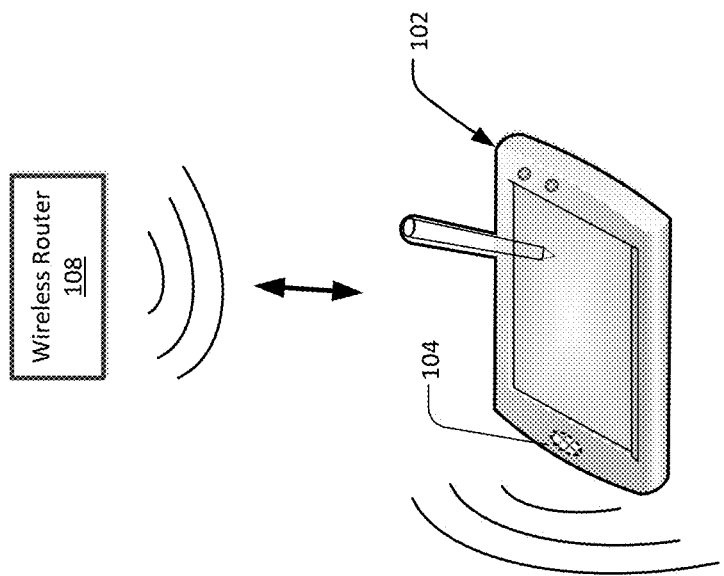
FIG. 1 illustrates an example scenario that implements improvements in a de-sensitivity of a receiver circuitry in a portable device.
Figure 1:
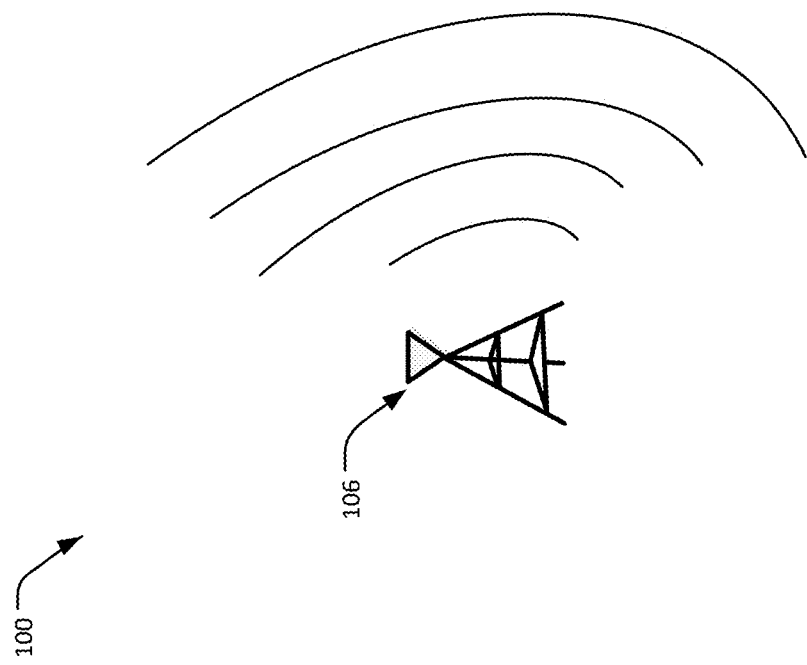

FIG. 1 is an example scenario 100 that utilizes BF techniques to improve de-sensitivity in a receiver circuitry or system of a portable device. The scenario 100 shows a portable device 102 with an antenna 104, a base station 106, and a wireless router 108.

The portable device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. The portable device 102 further supports a broad array of cellular and wireless services over a very broad frequency range. For example, in addition to cellular services such as GSM, UMTS, or LTE, the portable device 102 may also offer Wi-Fi/WLAN, BT, and GPS connectivity.

As shown, the portable device 102, for example, may communicate with another portable device (not shown) in a network environment. The network environment, for example, includes a cellular network that facilitates communications between the portable device 102 and the other portable device through the base station 106. During this cellular network communications, downlink (DL) and/or uplink (UL) data communications between the portable device 102 and the base station 106 may be affected by co-running Bluetooth (BT), Wi-Fi feature, and the like, within the portable device 102. Thus, the implementations described herein may facilitate improvements in the de-sensitivity, for example, of a cellular modem (not shown) for the cellular network communications that is co-running with said BT feature, Wi-Fi feature, and the like. Alternatively, the BT, Wi-Fi feature, and the like, may be the ones affected by the cellular modem and in such a case, the implementations described herein may similarly apply as well.

The wireless router 108 may include a device that facilitates wireless connection between the portable 102 and a wired Ethernet connection. For example, the wireless router 108 may include a Wi-Fi router that provides a hotspot in a particular place. In this example, the Wi-Fi router may receive data signals from the portable device 102 (during UL data communication) and sends the received data signals to Internet using a physical, wired Ethernet connection. Similarly, the Wi-Fi router may communicate data to the portable device 102 (during DL data communication) using the wireless connection between the two.

Although FIG. 1 shows the single antenna 104, the portable device 102 may include other antennas such as an LTE antenna, other diversity antennas, and Wi-Fi or BT antennas. For example, the Wi-Fi feature of the portable device 102 may utilize two or more antennas that are distinct and separate from the antenna 104 that is used for the cellular network communication. In this example, the implementations described herein may include adjustment of beamforming vectors at the two or more Wi-Fi antennas to improve the de-sensitivity in the cellular modem, or vice-versa. That is, the beamforming vectors adjustment at the antenna 104 may be used to improve the de-sensitivity in the Wi-Fi communication.

Figure 2A:
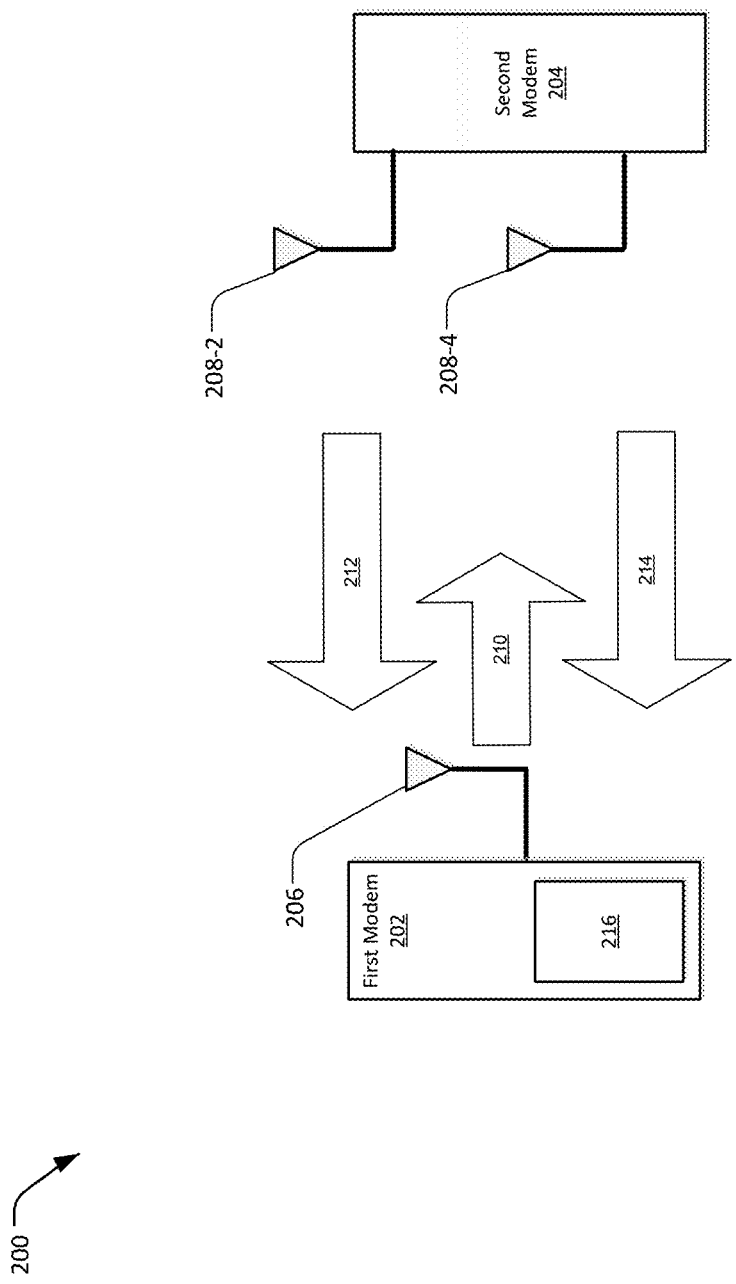
FIGS. 2A and 2B illustrate example arrangement of a receiver circuitry in accordance with implementations described herein.

FIG. 2A is an example arrangement 200 between at least two modems to illustrate a de-sensitivity improvement in a receiver circuitry of the portable device as described in the implementations herein. For example, the arrangement 200 includes a first modem 202 whose de-sensitivity is affected by a co-running operation of a second modem 204. In this example, the first modem may include at least one antenna 206, while the second modem 204 may include at least two antennas 208-2 and 208-4. Furthermore, in the same example, the arrangement 200 shows a first set of RF signals 212, a feedback signal 214, and a second set of RF signals 214.

For purposes of illustrating the implementations described herein, the first modem 202 may include, but is not limited to, a cellular/LTE modem while the second modem 204 may include, but is not limited to, a Wi-Fi modem that is located within the same portable device such as the portable device 102. The cellular/LTE modem, in this illustration, may perform DL and/or UL data communications using a global system for mobile communications (GSM), a general packet radio services (GPRS), enhanced data rages for GSM evolution (EDGE), a 3G, or a 4G LTE system. On the other hand, the co-running Wi-Fi modem may facilitate wireless communications between the portable device 102 and the wireless router 108 using a different frequency spectrum than that of the cellular/LTE modem. As used herein and particularly in the implementation description of the arrangement 200, the first modem 202 may interchangeably be referred to as the cellular/LTE while the second modem 204 may interchangeably be referred to as the Wi-Fi.

During a discontinuous reception (DRX) mode, the first modem 202 (i.e., cellular/LTE modem) may receive the first set of RF signals 212 from the second modem 204 (i.e., Wi-Fi modem). In an implementation, the first set of RF signals may include a set of calibrating RF signals (interchangeably referred to as the set of RF signals herein) that is separately transmitted by the at least two antennas 208-2 and 208-4 of the second modem 204. This set of calibrating RF signals, for example, may include different amount of RF signal amplitude gains and phase differences for each transmission sub-carrier and are sequentially transmitted by the at least two antennas 208-2 and 208-4 during a calibration stage. As further discussed below, the calibration may include, but is not limited to, a brute force calibration mode, a reduced time calibration mode, a separate angle calibration phase and a gain calibration phase, a one-shot calibration mode, and on on-the-fly calibration mode.

With the received first set of RF signals 212, the first modem 202 processes the received calibrating RF signals to determine its possible impact or signal interference on a frequency of operation of the first modem 202. For example, the first modem 202 may include a transceiver component 202, which may be a software, firmware, hardware, or a combination thereof, that is configured to perform an algorithm to determine the impact of the first set of RF signals 212 to the data communication feature of the first modem 202. The impact, for example, includes an out-of-band current overdrive at the antenna 106 of the first modem 202, or the impact may include an in-band interference at the first modem 202. In this example, the algorithm may be utilized to compute for an optimum beamforming vector based on the determined impact, the RF amplitude gain and phase at each transmission sub-carrier that is used to transmit the first set of RF signals 212. The optimum beamforming vector, for example, may facilitate nulling of the at least one antenna 206 that initially incurred an out-of-band current overdrive interference or an in-band interference; or it may facilitate reduction of the out-of-band overdrive interference or the in-band interference in the at least one antenna 206 to below a configured threshold value.

In another example, the first modem 202 does not compute for the optimum beamforming vector but rather, the first modem 202 may measure the signal energy for each transmission sub-carrier of the received first set of RF signals 212 and thereafter sends the measured signal energy to the second modem 204. In this other example, the second modem 204 may be configured to utilize this measured signal energy to compute for the optimum beamforming vector on each transmission sub-carrier. In these examples, the determined optimum beamforming vector or the measured signal energy may be sent through the feedback signal 210, while an adjusted calibrated RF signals may be transmitted through the second set of RF signals 214. The second set of RF signals, for example, may include the optimum beamforming vector that may null or reduce the interference at the at least one antenna 206 below the configured threshold value. The threshold value (i.e., epsilon "$\epsilon1$"), in this example, may include the allowable de-sensitivity for the first modem 202 to operate concurrently with the second modem 204 notwithstanding the presence of the out-of-band overdrive interference or the in-band interference as described herein.

In an implementation, the determined optimum beamforming vector may correspond to each calibrating RF signal in the transmission sub-carrier. That is, the determined optimum beamforming vector may be based upon a particular amplitude and/or phase of the calibrating RF signal at each transmission sub-carrier and for a particular transmitting antenna (e.g., antenna 208-2). Similarly, the same is true for the optimum beamforming vector calculation at each transmission sub-carrier of the other transmitting antenna 208-4, and so on, if there are other antennas 208 that are used in the second modem 204.

With the determined optimum beamforming vector by the transceiver component 216, the transceiver component 216 may transmit this determined optimum beamforming vector through the feedback signal 210. The determined optimum beamforming vector, for example, may be used by the second modem 204 for adjusting and forming of the second set of RF signals 214 that produces a nulling effect and/or less interference at the at least one antenna 206 of the first modem 202. That is, the second set of RF signals 214 provides an improvement on the de-sensitivity of the first modem 202 so that the co-running operations between the first modem 202 and the second modem 204 may be implemented.

In a case where the first modem 202 is in receive (RX) mode rather than in DRX mode as discussed above, the same operations as discussed above may be implemented. However, the impact or interference determination due to the first set of RF signals 212 may include a measured DL energy during DL data communication by the first modem 202.

Although the above implementation of the arrangement 200 may provide the basic process/principle for nulling or decreasing interferences at the first modem 202, other types of calibration modes, processes, and fine tuning discussed below may generally adapt the same basic process/principle as discussed above.

For example, the first set of RF signals 212 may be utilized to implement the separate phase/angle calibration phase and the gain calibration phase. That is, the determination of the optimum beamforming vector for both phase and gain variables are determined separately.

To implement the angle (i.e., θ) calibration phase, the second modem 204, for example, may sequentially transmit on its transmission sub-carriers (or frequency bins) "k" sine waves that spans a set of "k" beamforming vectors. That is, the second modem 204 may transmit "k" transmissions for each transmission sub-carrier or a group of transmission sub-carriers. Each of these transmission sub-carriers is transmitted with a continuous waveform (CW), binary phase shift keying (BPSK), or a quadrature phase shift keying (QPSK) signal and in addition, each transmission sub-carrier has a different phase or angle θ. Alternatively, each of these transmission sub-carriers may transmitted with other types of modulations and is not limited to the CW, BPSK, or QPSK above.

In an implementation, the transmission of the first set of RF signals 212 for the angle calibration phase may be repeated for all of the transmission sub-carriers. In this implementation, the first modem 202 may measure the signal energy of each transmission sub-carrier in the set of "k" beamforming vectors (i.e., received first set of RF signals 212) and thereafter feedback the measured signal energy for each phase or angle value through the feedback signal 210. The measured signal energy may include measured out-of-band overdrive currents in cases where the first modem 202 is blocked by the first RF signal 212 (i.e., for the angle calibration phase), or the measured signal energy may include the amount of interferences (i.e., in-band energy) in cases where the first modem 202 is not blocked but merely affected by the interference from the first set of RF signals 212.

With the received measured signal energy, the second modem 204 may select the optimum angle θ that: 1) minimizes the interference energy for each transmission sub-carrier bin in case of measured in-band energy; or 2) nulls the at least one antenna 206 of the first modem 202 in case of out-of-band measured energy. For the out-of-band measured energy, at least two antennas 208 from the second modem 204 may completely null one antenna 206 at the first modem 202.

With the optimized beamforming vector (i.e., for the angle calibration phase), the new set of RF signals that nulls and/or minimizes interferences at the first modem 202 may be transmitted through the second set of RF signals 214 as shown. Alternatively, rather than having the second modem 204 to compute for the optimized beamforming vector (i.e., for the angle calibration phase), the first modem 202 may feedback for each transmission sub-carrier of the second modem 204 the suggested best angle or phase for each transmission sub-carrier.

With the adjusted optimal value for the angle calibration phase as determined above, the gain calibration phase may be performed next on the arrangement 200. For example, the second modem 204 may sequentially transmit on its transmission sub-carriers (or frequency bins) "m" sine waves that spans a set of "m" gains. That is, the second modem 204 may transmit "m" transmissions for each transmission sub-carrier or a group of transmission sub-carriers. Each of these transmission sub-carriers is again transmitted with the CW, BPSK, or the QPSK signal (or any other types of modulation), and in addition, each transmission sub-carrier may include a different gain (i.e., gain "A").

In an implementation, the transmission of the first set of RF signals 212 for the gain calibration phase may be repeated for all of the transmission sub-carriers. In this implementation, the first modem 202 may feedback the measured signal energy received for each gain value for the set of "m" values through the feedback signal 210. Similar to the angle calibration phase above, the measured signal energy may include measured out-of-band overdrive currents in cases where the first modem 202 is blocked by the first RF signal 212 for the gain calibration phase, or the measured signal energy may include the amount of interferences (i.e., in-band energy) in cases where the first modem 202 is not blocked but merely affected by the interference from the first set of RF signals 212.

With the received measured signal energy, the second modem 204 may select the optimum gain "A" that: 1) minimizes the interference energy for each transmission sub-carrier bin in case of measured in-band energy; or 2) nulls the at least one antenna 206 of the first modem 202 in case of out-of-band measured energy.

With the optimized beamforming vector (i.e., for the gain calibration phase), the new set of RF signals that nulls and/or minimizes interferences at the first modem 202 may be transmitted through the second set of RF signals 214. Alternatively, the first modem 202 may feedback for each transmission sub-carrier of the second modem 204 the suggested best gain for each transmission sub-carrier. In both cases, the separate gain and angle calibration phases may further improve the de-sensitivity at the first modem 202 although the process may involve more time to implement. Furthermore, in order to fine tune the calibration beamforming vector in this mode, the angle calibration phase may be performed again by adjusting the optimal gain "A" and performing a second angle calibration phase swipe with a smaller range in the vicinity of the found in the first calibration phase.

In an implementation, during a time division duplex (TDD) mode in the first modem 202, the first set of RF signals 212 may be initiated at UL sub-frame where the first modem 202 does not have any UL allocation from the base station 106 or another nearby device. Furthermore, in a case where the transmission interference from the second modem 204 is substantially high in energy and causes blocking at the first modem 202, the second modem 202 may be configured to reduce its transmit power by a particular amount as a part of the calibration modes/process described herein.

The additional types or modes of improving de-sensitivity in the arrangement 200 are further discussed below. As mentioned earlier, these other implementations may basically follow the principle as described above except, for example, where additional features may further facilitate time savings or may further improve the de-sensitivity in the arrangement 200.

In an implementation, with regard to the brute force calibration mode, a similar operation as discussed for the angle calibration phase may be applied. However, each of the transmission sub-carriers is transmitted with the CW, BPSK, or the QPSK signal while the other transmission sub-carriers may have a zero amplitude; and furthermore, each symbol has a different gain and phase (i.e., A, θ) combination that represents a particular "b" beamforming vector out of the {m, k} beamforming vector set. Furthermore still, for each transmission sub-carrier, the first modem 202 may feedback the measured received energy for each {m, k} beamforming vector set i.e., total number of transmission sub-carriers multiplied by "m" and "k" values. Upon receiving of this feedback by the second modem 204, the second modem 204 may select the best beamforming vector set that minimizes the interference energy or the nulling effect on each transmission sub-carrier bin. Alternatively, the first modem 202 may feedback for each transmission sub-carrier of the second modem 204 the suggested best beamforming vector for each transmission sub-carrier.

In another implementation, with regard to the reduced time calibration mode, the reduction of the order of the search grid from m*k to m̂+k may be based on the knowledge that the optimal gain and angle (i.e., A, θ) are independent to each other and as such, a global optimum may be found by finding the optimum for each gain and angle separately as discussed above.

In another implementation, with regard to the one-shot calibration mode, the first modem 202 may be able to feedback the signal energy of its out-of-band energy using a single measurement when the central frequency ($f_c$) of the first modem 202 may be tuned to the central frequency ($f_c$) of the second modem 204. In other words, when the first modem 202 and the second modem 204 are tuned to the same central frequency $f_c$, the first modem 202 may measure the signal energy on the transmission sub-carriers in one shot. Alternatively, the first modem 202 and the second modem 204 are not tuned to the same central frequency $f_c$; however, the first modem 202 may receive the in-band interference at another frequency that is tuned to frequency of the aggressor second modem 204.

Currently, there is no need for the first modem 202 to receive at the frequency band of the second modem 204; however, in case, for example, when LTE—Unlicensed initiative (i.e., for the first modem 202) may become a standard, then the first modem 202 may be able to receive at said frequency band of the second modem 204 as both may reside within the 5 GHZ band.

In an implementation, the one-shot calibration mode may be implemented as follows: 1) the second modem 204 transmits a sine wave on each transmission sub-carrier through the first antenna 208-2 and as a result, the second modem 204 may receive a feedback (i.e., measured signal amplitude and phase) from the first modem 202 on each frequency bin; 2) the second modem 204 transmits the same sine waves through the second antenna 208-4 and as a result, the second modem 204 may receive another feedback (i.e., measured signal amplitude and phase) from the first modem 202 on each frequency bin. With these two measurements, the second modem 204 may be configured to measure the vector $b=\{A, \theta\}=_{A \cdot e^{j \cdot 1}}$ per transmission sub-carrier that is utilized by the second modem 204. Furthermore, based on the same two measurements, the channel matrix coefficient may be derived and the vector b may be determined, which satisfies the equation: $H_{LTE}b=0$.

With regard to the on-the-fly calibration mode, which may be utilized to save the requirement of pre-engineering calibration of the beamforming vectors, the calibration mode or process may follow the calibration mode as discussed above. However, in tracking mode, the second modem 204 may pre-load for each transmission sub-carrier the default beamforming vector $\{m,k\}$ which may be derived using the brute force calibration mode. To this end, the on-the-fly calibration mode may find the optimal and best $\{m,k\}$ vector for each transmission sub-carrier resulting to the minimum interference energy at the antenna 206 of the first modem 202.

Since the calibration is on-the-fly, the second modem 204 may transmit, for example, a standard packet such as the Wi-Fi packet that may indicate to the first modem 202 the time when the first symbol containing the calibration RF signal is present. In this example, the first modem 202 may enter into energy measurement mode in order to measure the signal energies at each transmission sub-carrier as discussed above.

The Wi-Fi standard packet from the second modem 204 may be received by neighboring Wi-Fi peers (not shown), however, the Wi-Fi standard packet will be discarded because the signal field may later fail or later the PDU CRC would fail.

Figure 2B:
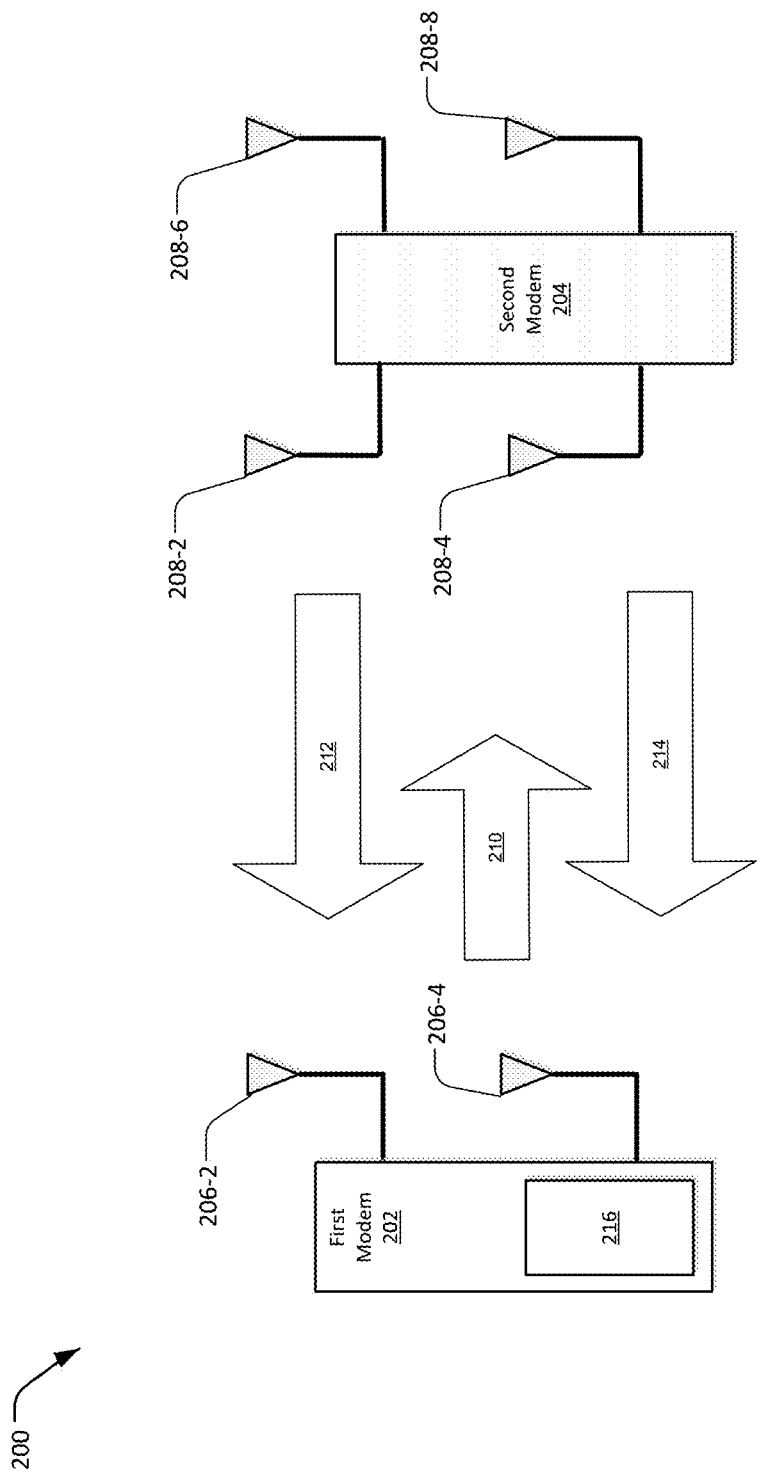

FIG. 2B is another example implementation of the arrangement 200 as described in present implementations herein. As shown, the arrangement 200 includes the features and elements as shown and described in FIG. 2A above plus the additional antenna 206-4 for the first modem 202 and the antennas 208-6 and 208-8 for the second modem 202.

In order to have optimal beamforming vectors, the initial calibration as described in FIG. 2A above may be performed. The optimal calibration vector for gain and angle (A, θ) may require adjustments over time in order to track the changing channel characteristics between the antennas 208 of the second modem 204 and the antennas 206 of the first modem 202. The change may be due to location of the device such as when it is located near a metal object, human body, and the like.

With continuing reference to FIG. 2B, the second modem 204 may utilize a random constant envelope BPSK or QPSK signal for each transmission sub-carrier. The second modem 204 may then preload for each transmission sub-carrier the beamforming vector that was derived in the calibration phase as discussed above. Afterwards, the second modem 204 may transmit at the transmission sub-carriers—through the first antenna 208-2—the random constant envelope BPSK or QPSK signal; and at the second antenna 208-4, the changing signal spanning the grid of $\{m,k\}$ beamforming vectors. These transmissions result to m*k symbols where each symbol may contain random data modulated frequency bins with different beamforming vectors.

The first modem 202, which is currently performing a DL data communication, may receive the first set of RF signals 212 (i.e., m*k symbols) on its current DL frequency and thereafter perform energy measurement for transmission sub-carrier (or frequency bin) per the beamforming vector $\{m,k\}$. In an implementation, the first modem 202 may report the best $\{m,k\}$ beamforming vector on the transmission sub-carriers that may result to minimum interference energy at the antennas 206-2 and 206-4. In this implementation, the best $\{m,k\}$ beamforming vector may satisfy the threshold values epsilons $\epsilon 1$ and $\epsilon 2$ for the antennas 206-2 and 206-4, respectively. The epsilons $\epsilon 1$ and $\epsilon 2$, in this implementation, may include the corresponding allowable de-sensitivity for the antennas 206 to operate concurrently with the second modem 204 notwithstanding the presence of the interference as described herein.

In an implementation, instead of using $H_{LTE}b=0$ above, a free variable that controls the amount of interference in each antenna 206 may be added by setting $H_{LTE}b=\epsilon$; $b=[_{A \cdot e^{j \cdot 1}}]$; to derive $h_{11}+h_{12}A \cdot e^{j \cdot \theta}=\epsilon_1$; and $h_{21}+h_{22}A \cdot e^{j \cdot \theta}=\epsilon_2$.

Since the (Wi-Fi) second modem 204 includes two antennas 208 that may perform a complete null in one antenna 206, then the set of A and θ which denote the steering coefficients may be selected to be a compromise on the residual Wi-Fi TX energy on the two LTE antennas 206-2 and 206-4. That is, the (Wi-Fi) second modem 204 may be configured to find a set of A and θ which achieves an adequate residual Wi-Fi signal energy in the LTE antennas 206-2 and 206-4, namely $|\epsilon_1|^2$ and $|\epsilon_2|^2$, respectively With the reported best $\{m, k\}$ beamforming vector, the second modem 204 may then update the beamforming vector for each transmission sub-carriers. In case that the drift from the initial beamforming calibration vector to the actual beamforming vector is substantially high that the interference energy is blocking the first modem 202, the second modem 204 may reduce its transmit power.

In an implementation, when the first modem 202 operates in a single input single output (SISO) mode, the second modem 204 may operate for all antennas 206 and 208 configurations. For example, for two antennas 206 and two antennas 208, the first modem 202 may inform the second modem 204 which antenna 206-2 or 206-4 is being used (either as static or Rx diversity). In this example, the second modem 204 may find the optimum beamforming vectors that cancel the interference in one or both antennas 206.

In another implementation, when the first modem 202 operates at multiple input multiple output (MIMO) mode, a perfect interference cancellation at one antenna 206-2 and a reduction of interference at another antenna 206-4 may be obtained in case where the residual energy are not enough for both antennas 206-2 and 206-4. Furthermore, when the packets from the second modem 204 are short (e.g., Ack packets, short packets <120 usec), then the first modem 202 may null the metrics coming out of the interfered antenna 206 which is blocked by the second modem 204. In such a case, the first modem 202 may have one clean antenna 206 (i.e., nulled antenna) and another antenna 206 that suffers from interference (i.e., in-band interference).

The method presented above may increase the length of the packet from the second modem 204; however, the first modem 202 may still receive on one clean antenna while the other antenna may have some in-band interference. In an implementation, when the receive chains of the two antennas 206 provide different level of interference protection such as by way of different filters implemented therein, then the antenna 206 to be selected to be clean may be the one with less protection in the frequency domain, if the latter alone ensures a good reception. Otherwise, if only the combination of interference reduction in the frequency domain and via BF is sufficient, then the antenna 206 to be selected to be clean may be the one with more protection in the frequency domain.

Figure 3:
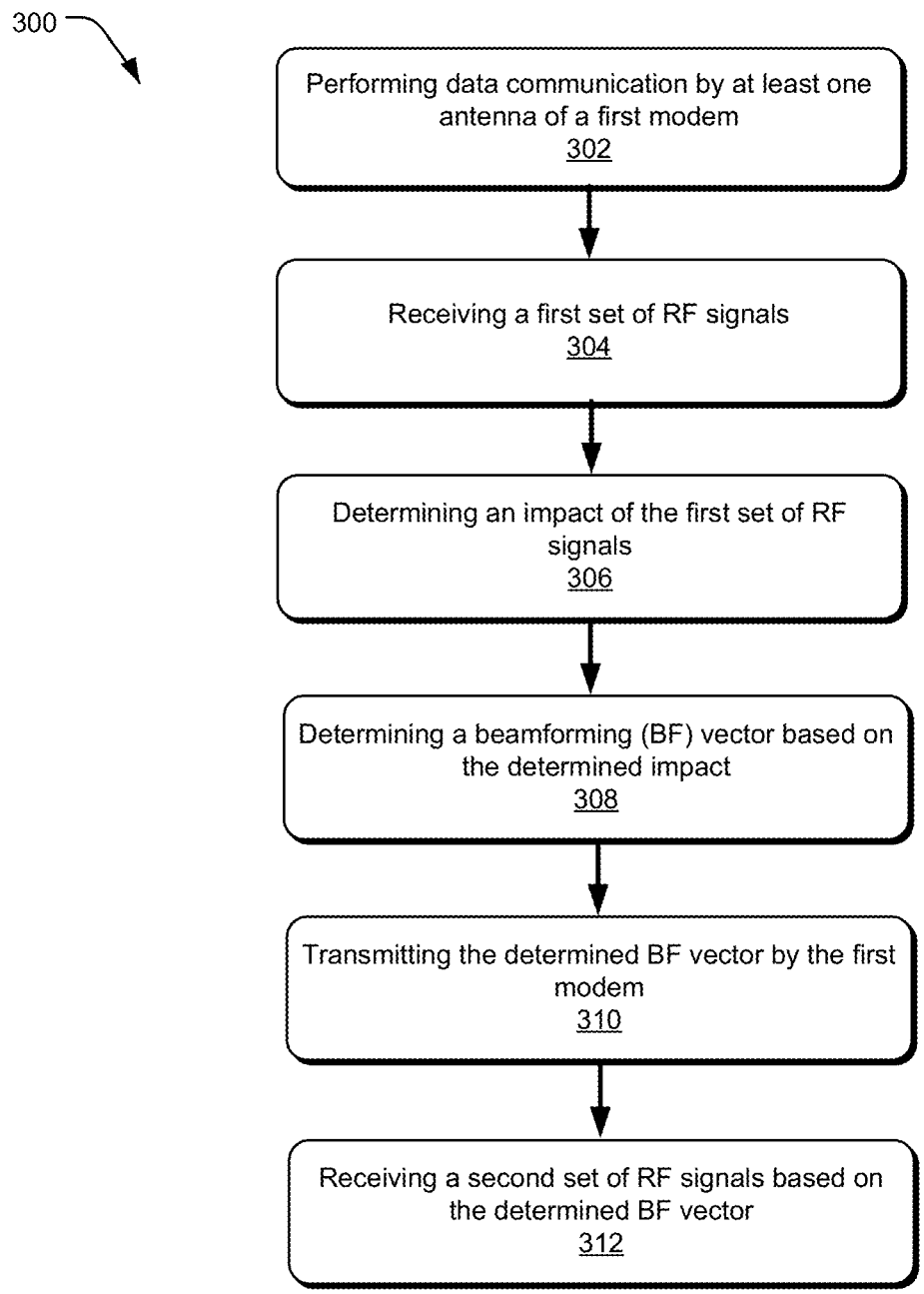
FIG. 3 illustrates an exemplary process for improving de-sensitivity and reduction of interferences in accordance with implementations described herein.

FIG. 3 shows an example process flowchart 300 illustrating an example method for improving de-sensitivity in a modem or a receiver circuitry of a portable device. For example, the process flowchart 300 relates to the improvement of de-sensitivity at a modem side (e.g., cellular/LTE modem) that receives the interfering signals. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302, performing data communication by at least one antenna of a first modem is performed. For example, the first modem 202 is a cellular/LTE modem that performs DL or UL data communications using the GSM, GPRS, EDGE, 3G, or the 4G system. In this example, the first modem 202 may utilize at least one antenna 206 for the DL or UL data communications. In another example, the first modem 202 may include any other wireless communication modem whose operating signal frequency may be affected by another wireless communication modem, transceiver system, and the like.

At block 304, receiving a first set of RF signals from a second modem is performed. For example, the first set of RF signals 212 is received through the antennas 206 of the first modem 202. In this example, the first set of RF signals 212 may include calibrating RF signals.

At block 306, determining an impact of the first set of RF signals is performed. For example, the transceiver component 216 of the first modem 202 may be configured to perform the algorithm that determines the impact of the first set of RF signals. In this example, the impact may include out-of-band overdrive current or an in-band interference to the antennas 206.

At block 308, determining a beamforming vector based on the determined impact is performed. For example, the optimized beamforming vector may be determined at the first modem 202 side. In another example, the first modem 202 merely measures the signal energies of the first set of RF signals 212 and sends these measured signal energies to the second modem 204 to use as basis for deriving the optimum beamforming vector.

At block 310, transmitting the determined beamforming vector is performed. For example, when the optimized beamforming vector is determined at the first modem 202, the first modem 202 transmits the determined optimized beamforming vector to the second modem 204 through the feedback 210. The feedback 210 may include a dedicated wired connection, or a wireless connection.

At block 312, receiving a second set of RF signals based on the determined beamforming vector is performed. For example, the second set of RF signals may null at least one antenna 206 of the first modem 202, or it may lessen the interferences at another antenna 206 of the same.

The following examples pertain to further embodiments:

Example 1 is a method of improving de-sensitivity in a receiver circuitry of a device, the method comprising: performing a data communication by at least one antenna of a first modem; receiving a first set of radio frequency (RF) signals from a second modem during the data communication; determining an impact of the first set of RF signals to the data communication that is currently performed in the first modem; determining a beamforming vector based on the determined impact of the first set of RF signals, wherein a second set of RF signals utilizes the determined beamforming vector; and receiving the second set of RF signals.

In Example 2, the method as recited in Example 1, wherein the data communication includes downlink and uplink data communications using a global system for mobile communications (GSM), a general packet radio services (GPRS), enhanced data rages for GSM evolution (EDGE), a 3G, or a 4G system.

In Example 3, the method as recited in Example 1, wherein the received first set of RF signals includes a set of calibrating RF signals that is separately transmitted by at least two antennas coupled to the second modem, wherein the set of calibrating RF signals includes a different amount of amplitude gains and phase differences for each transmission sub-carrier.

In Example 4, the method as recited in Example 3, wherein the set of calibrating RF signals are pre-configured to include a brute force calibration mode, a reduced-time calibration mode, a one-shot calibration mode, or an on-the-fly calibration mode.

In Example 5, the method as recited in Example 1, wherein the determining the impact includes determining an amount of interference received from each transmission sub-carrier, wherein the amount of interference produces an out-of-band current overdrive or an in-band interference on the at least one antenna of the first modem.

In Example 6, the method as recited in Example 5 further comprising: nulling metrics of the at least one antenna with the out-of-band current overdrive to provide a at least one nulled antenna, wherein the beamforming vector reduces the in-band interference on the other at least one antenna.

In Example 7, the method as recited in Example 1, wherein the determining the beamforming vector is based on different amount of amplitude gains and phase differences for each transmission sub-carrier.

In Example 8, the method as recited in Example 1, wherein the determining the impact includes identifying a transmission sub-carrier that causes an out-of-band current overdrive or an in-band interference to the at least one antenna.

In Example 9, the method as recited in Example 1, wherein the first modem is a 2G, 3G, 4G, or an LTE modem.

In Example 10, the method as recited in Example 1, wherein the second modem is a Wi-Fi or a Bluetooth (BT) modem.

In Example 11, the method as recited in Example 1, wherein the determining the beamforming vector for an in-band interference includes comparing of the beamforming vector of a particular transmission sub-carrier to a configured threshold value.

In Example 12, the method as recited in Example 1, wherein the second set of RF signals includes a reduced RF power that is combined with the determined beamforming vector.

Example 13 is a device receiver comprising: at least one antenna configured to transmit or receive radio frequency (RF) signals, wherein the received RF signals include a set of calibrating RF signals; a transceiver component coupled to the least one antenna, the transceiver component is configured to determine an amount of interference that is produced from each transmission sub-carrier of the set of calibrating RF signals, wherein the transceiver component determines a beamforming vector that is based on the determined amount of interference of said each transmission sub-carrier, wherein the transceiver component transmits the determined beamforming vector as a feedback to the received set of calibrating RF signals.

In Example 14, the device receiver as recited in Example 13, wherein the set of calibrating RF signals is received during a discontinuous receive (DRX) mode or during a data communication operation of the transceiver component.

In Example 15, the device receiver as recited in Example 14, wherein the set of calibrating RF signals is transmitted by at least two other antennas.

In Example 16, the device receiver as recited in Example 13, wherein the transceiver component is a 2G, 3G, 4G, or an LTE transceiver component.

In Example 17, the device receiver as recited in Example 13, wherein the transceiver component is further configured to measure signal energies from each transmission sub-carrier, wherein the measured signal energies in an in-band and/or out-of-band frequency spectrum is utilized to determine the beamforming vector by the transceiver component or by another device that transmitted the set of calibrating RF signals.

Example 18 is a method of improving de-sensitivity in a receiver circuitry of a device, the method comprising: performing a downlink data communication by at least one antenna of a first modem; receiving of a first set of calibrating radio frequency (RF) signals from a second modem during the downlink data communication; determining an impact of the first set of calibrating RF signals to the downlink data communication that is currently performed in the first modem; measuring signal energies on each transmission sub-carrier of the first set of calibrating RF signals; transmitting the measured signal energies that are used by the second modem for determining a beamforming vector, wherein the optimum beamforming vector is utilized for adjusting and forming of a second set of RF signals; and receiving the second set of RF signals by the first modem.

In Example 19, the method as recited in Example 18, wherein the first modem is a 2G, 3G, 4G, or an LTE advanced modem.

In Example 20, the method as recited in Example 18, wherein the second set of RF signals is further based on channel matric change between an aggressor—second modem and a victim—first modem.

What is claimed is:

1. A method of improving de-sensitivity in a receiver circuitry of a device, the method comprising:
   performing a data communication by at least one antenna of a first modem;
   receiving a first set of radio frequency (RF) signals from a second modem during the data communication, the received first set of RF signals includes a set of calibrating RF signals that is separately transmitted by at least two antennas coupled to the second modem, wherein the set of calibrating RF signals includes a different amount of amplitude, gain, and phase differences for each transmission sub-carrier;
   determining an impact of the first set of RF signals to the data communication that is currently performed in the first modem, the determining the impact includes determining an amount of interference received from each transmission sub-carrier, wherein the amount of interference produces an out-of-band current overdrive or an in-band interference on the at least one antenna of the first modem;
   determining a beamforming vector based on the determined impact of the first set of RF signals, wherein a second set of RF signals utilizes the determined beamforming vector; and
   receiving the second set of RF signals.

2. The method as recited in claim 1, wherein the data communication includes downlink and uplink data communications using a global system for mobile communications (GSM), a general packet radio services (GPRS), enhanced data rages for GSM evolution (EDGE), a 3G, or a 4G system.

3. The method as recited in claim 1, wherein in response to the determined beamforming vector, the amplitude, gain, and phase differences for each transmission sub-carrier of the second set of RF signals are adjusted to null the out-of-band current overdrive or to reduce the in-band interference.

4. The method as recited in claim 3, wherein the set of calibrating RF signals are pre-configured to include a brute force calibration mode, a reduced-time calibration mode, a one-shot calibration mode, or an on-the-fly calibration mode.

5. The method as recited in claim 1 further comprising: transmitting the determined beamforming vector to the second modem prior to the receiving of the second set of RF signals.

6. The method as recited in claim 1 further comprising: nulling metrics of the at least one antenna with the out-of-band current overdrive to provide an at least one nulled antenna, wherein the beamforming vector reduces the in-band interference on the other at least one antenna.

7. The method as recited in claim 1, wherein the determining the beamforming vector is based on different amount of amplitude, gain, and phase differences for each transmission sub-carrier.

8. The method as recited in claim 1, wherein the determining the impact includes identifying a transmission sub-carrier that causes the out-of-band current overdrive or the in-band interference to the at least one antenna.

9. The method as recited in claim 1, wherein the first modem is a 2G, 3G, 4G, or an LTE modem.

10. The method as recited in claim 1, wherein the second modem is a Wi-Fi or a Bluetooth (BT) modem.

11. The method as recited in claim 1, wherein the determining the beamforming vector for the in-band interference includes comparing of the beamforming vector of a particular transmission sub-carrier to a configured threshold value.

12. The method as recited in claim 1, wherein the second set of RF signals includes a reduced RF power that is combined with the determined beamforming vector.

13. A device receiver comprising:
at least one antenna configured to transmit or receive radio frequency (RF) signals, wherein the RF signals that are received during a discontinuous receive (DRX) mode or during a data communication operation include a set of calibrating RF signals from at least two antennas that are coupled to another modem;
a transceiver component coupled to the least one antenna, the transceiver component is configured to measure signal energies from each transmission sub-carrier of the set of calibrating RF signals, the measured signal energies in an in-band and out-of-band frequency spectrum is utilized by the transceiver component to determine a beamforming vector to correct an amount of interference that is produced from said each transmission sub-carrier, wherein the amount of interference produces an out-of-band current overdrive or an in-band interference on the at least one antenna, wherein the transceiver component transmits the determined beamforming vector as a feedback to the received set of calibrating RF signals.

14. The device receiver as recited in claim 13, wherein the set of calibrating RF signals includes a different amount of amplitude, gain, and phase differences for each transmission sub-carrier.

15. The device receiver as recited in claim 14, wherein the data communication includes downlink and uplink data communications using a global system for mobile communications (GSM), a general packet radio services (GPRS), enhanced data rages for GSM evolution (EDGE), a 3G, or a 4G system.

16. The device receiver as recited in claim 13, wherein the transceiver component is a 2G, 3G, 4G, or an LTE transceiver component.

17. The device receiver as recited in claim 13, wherein the transceiver component is further configured to receive another set of RF signals that include an adjusted amplitude, gain, and phase differences to null the out-of-band current overdrive or to reduce the in-band interference.

18. A method of improving de-sensitivity in a receiver circuitry of a device, the method comprising:
performing a downlink data communication by at least one antenna of a first modem;
receiving of a first set of calibrating radio frequency (RF) signals from a second modem during the downlink data communication, the received first set of RF signals includes a set of calibrating RF signals that is separately transmitted by at least two antennas coupled to the second modem, wherein the set of calibrating RF signals includes a different amount of amplitude, gain, and phase differences for each transmission sub-carrier;
determining an impact of the first set of calibrating RF signals to the downlink data communication that is currently performed in the first modem, wherein the determining the impact includes determining an amount of interference received from each transmission sub-carrier, wherein the amount of interference produces an out-of-band current overdrive or an in-band interference on the at least one antenna of the first modem;
determining an optimum beamforming vector based on the determined amount of interference;
transmitting the determined optimum beamforming vector to the second modem, wherein the optimum beamforming vector is utilized for adjusting and forming of a second set of RF signals; and
receiving the second set of RF signals by the first modem, wherein the second set of RF signals nulls metrics of the at least one antenna with the out-of-band current overdrive to provide an at least one nulled antenna, wherein the second set of RF signals reduces the in-band interference on the other at least one antenna.

19. The method as recited in claim 18, wherein the first modem is a 2G, 3G, 4G, or an LTE advanced modem.

20. The method as recited in claim 18, wherein the second set of RF signals is further based on channel matrix coefficient change between an aggressor—second modem and a victim—first modem.

* * * * *